May 2, 1950  L. M. CHRISTIE  2,506,064
CABLE PROTECTOR
Filed Sept. 19, 1945

INVENTOR
Llewellyn M. Christie
BY
William B. Jaspert
ATTORNEY

Patented May 2, 1950

2,506,064

UNITED STATES PATENT OFFICE 2,506,064

CABLE PROTECTOR

Llewellyn M. Christie, Pittsburgh, Pa., assignor to National Fireproofing Corporation, Pittsburgh, Pa., a corporation of Pennsylvania Application September 19, 1945, Serial No. 617,275

2 Claims. (Cl. 174—38)

This invention relates to new and useful improvements in cable protectors, and it is among the objects thereof to provide a simple and expedient means for joining underground cable conduit ends with above ground cable protectors mounted on poles, building walls or the like.

It is a further object of the invention to provide bends for cable conduits which shall be adapted for use with either square or round conduit, and which shall be especially suitable for connection by adaptors with cable protectors mounted above ground.

Figure 4:
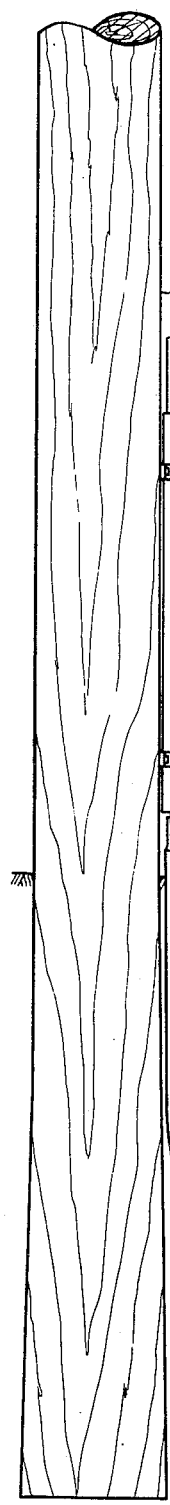
Figure 4:
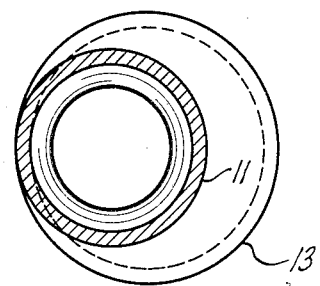
Figure 5:
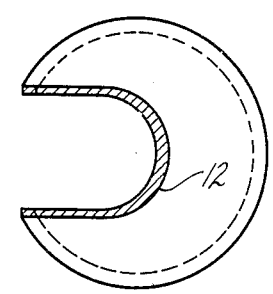
Figure 6:
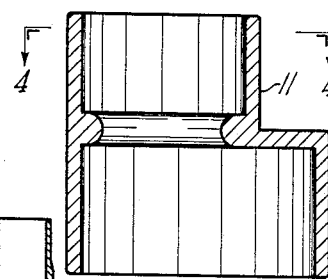
Figure 7:
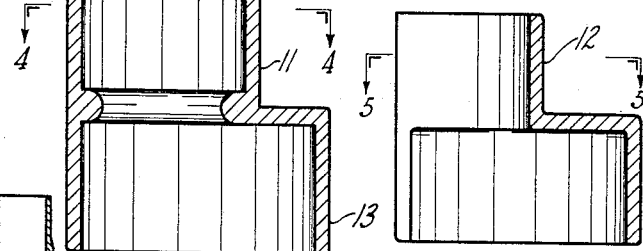
Figure 2:
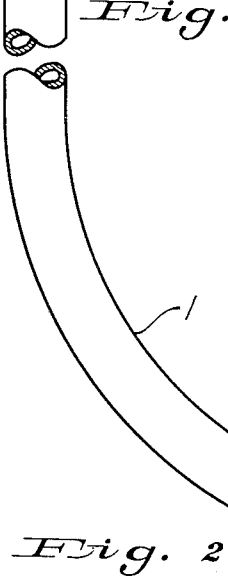
Figure 3:
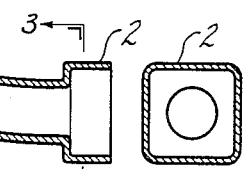
Figure 1:
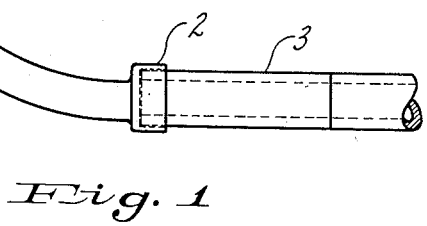

These and other objects of the invention will become more apparent from a consideration of the accompanying drawing, constituting a part hereof, in which like reference characters designate like parts, and in which Fig. 1 is a side elevational view of a portion of a cable pole, cable conduit and cable protector with a pipe bend and adaptors embodying the principles of this invention;

Fig. 2 a side elevational view, partially in section, of the pipe bend;

Fig. 3 a cross-section taken along the line 3—3, Fig. 2;

Fig. 4 a top plan view of one form of adaptor utilized in joining the pipe bend to the cable protector taken on the line 4—4, Fig. 6;

Fig. 5 a sectional elevational view taken along the line 5—5, Fig. 7 of another form of adaptor; and Figs. 6 and 7 cross-sectional views, respectively, of the adaptors shown in Figs. 4 and 5.

In the drawing the numeral 1 designates a bent cast iron pipe which is an integral casting having a flanged end 2 which, as shown in Figs. 2 and 3, is of rectangular form to adapt it for fitting with either rectangular or round cable conduit designated by the numeral 3, Fig. 1. The conduit which is underground is inserted in the flanged end of the bent cast iron pipe and is sealed by a caulking compound or other suitable material. The bend 1 is provided with a relatively long straight end 4 which extends to the street level designated by the numeral 5, the long straight portion 4 allowing for the laying of the cable conduit 3 at any desired depth within the limits of the straight portion.

As shown in Fig. 1, the pipe bend is disposed adjacent a pole 6 extending parellel therewith a distance underground corresponding to the length of the straight portion. The cable, which is designated by the numeral 7, extends from the top of the pole through the bent cast iron pipe 1 into the cable conduit 3 and is protected above ground by a protector 8 which may be a galvanized sheet metal housing that is secured to the pole 6 by metal straps 9. Adaptors of the kind shown in Figs. 4 to 7, designated by the numeral 10 in Fig 1, are disposed between the end of the protector 8 and the bent pipe 1. They are especially shaped, as, for example, shown in Figs. 4 and 5, to be engaged at their small portion 11 or 12 by the protector 8 which may be either round or channel shaped, the larger portion 13 fitting over the reduced end 14 of the bent pipe 1. The assembled adaptor is held in place when the protector 8 is secured to the pole by the straps 9. When the cable conduit 3 is laid shallow the long end 4 of the pipe bend extends further vertically from the ground level and itself acts as an exterior protector.

Although one embodiment of the invention has been herein illustrated and described, it will be evident to those skilled in the art that various modifications may be made in the details of construction without departing from the principles herein set forth.

I claim:

1. A cable protector comprising a bent conduit having a curved portion terminating in a flanged end for receiving the end of a cable conduit and having a tangent portion of substantial length, the terminal of which is reduced for receiving an adaptor, the flanged end of the curved portion of the bent conduit being square for receiving either a round or square conduit.

2. A cable protector comprising a bent cast iron pipe having a square flange at one end and a reduced portion at the other, said square flange constituting the terminal of the bent portion of the cast iron pipe and being of rectangular form for receiving either cylindrical or square cable conduit, and said bent cast iron conduit having a tangent portion adapted to be disposed adjacent the outer surface of a line pole to protect the cable adjacent the ground surface, the tangent portion being of a length to permit adjustment of the bent cast iron member to the depth of the cable conduit from the ground surface and having its terminal reduced for receiving an adapter.

LLEWELLYN M. CHRISTIE.

REFERENCES CITED

The following references are of record in the file of this patent:

UNITED STATES PATENTS

| Number | Name | Date |
|---|---|---|
| 254,268 | Brooks | Feb. 28, 1882 |
| 290,045 | Hardy | Dec. 11, 1883 |
| 567,231 | Glauber | Sept. 8, 1896 |
| 1,374,866 | Spencer | Apr. 12, 1921 |
| 1,801,171 | Mueller et al. | Apr. 14, 1931 |
| 2,230,734 | Van Antwerp | Feb. 4, 1941 |
| 2,337,584 | Baker | Dec. 28, 1943 |
| 2,343,402 | Clifford | Mar. 7, 1944 |